US008141935B2

(12) United States Patent
Thota et al.

(10) Patent No.: US 8,141,935 B2
(45) Date of Patent: Mar. 27, 2012

(54) DOOR TRIM MOVING APPLIQUE

(75) Inventors: Bhavani Thota, Sterling Heights, MI (US); Kenneth S. Laird, Canton, MI (US); Chris Richardson, Hampton, VA (US); Gary D. Mullen, Farmington, MI (US); Kevin Murphy, Dexter, MI (US); Adrian Nicholas Alexander Elliott, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 12/550,509

(22) Filed: Aug. 31, 2009

(65) Prior Publication Data

US 2011/0047882 A1    Mar. 3, 2011

(51) Int. Cl.
*B60J 5/06* (2006.01)
(52) U.S. Cl. ....... 296/155; 296/1.08; 296/39.1; 296/202
(58) Field of Classification Search ................ 296/155, 296/146.11, 146.7, 202, 39.1, 1.08; 49/502, 49/404
See application file for complete search history.

(56) References Cited

U.S. PATENT DOCUMENTS

| | | | | |
|---|---|---|---|---|
| 4,483,893 A | * | 11/1984 | Harrold | 428/90 |
| 4,991,905 A | * | 2/1991 | Watanabe et al. | 296/155 |
| 6,776,450 B2 | | 8/2004 | Okubo et al. | |
| 7,261,364 B2 | * | 8/2007 | Tanigawa | 296/155 |
| 7,717,493 B2 | * | 5/2010 | Plavetich | 296/155 |
| 7,823,949 B2 | * | 11/2010 | VandenHeuvel et al. | 296/37.8 |

FOREIGN PATENT DOCUMENTS

| | | |
|---|---|---|
| FR | 2801251 | 5/2001 |
| JP | 2008-155822 | 7/2008 |
| JP | 2008-162382 | 7/2008 |
| UA | 738486 | 4/1953 |
| WO | WO2008/095728 | 8/2008 |

OTHER PUBLICATIONS

2003 Ford Windstar Review—2003 Ford Windstar Road Test & Research, www.autobuyguide.com/2003/12-aut/ford/windstar/reviews/index.html, ©2008 AutoBuyGuide.com, 5 pages.

* cited by examiner

*Primary Examiner* — Glenn Dayoan
*Assistant Examiner* — Pinel Romain
(74) *Attorney, Agent, or Firm* — Gregory P. Brown; Price Heneveld LLP

(57) ABSTRACT

A sliding door panel for covering an opening in a trim panel of a sliding door includes a bracket having a first guiding member. The sliding door panel includes is a sliding appliqué having a second guiding member capable of associating with the first guiding member, and wherein the sliding appliqué includes a first end having a protruding configuration extending away from the trim panel.

23 Claims, 5 Drawing Sheets

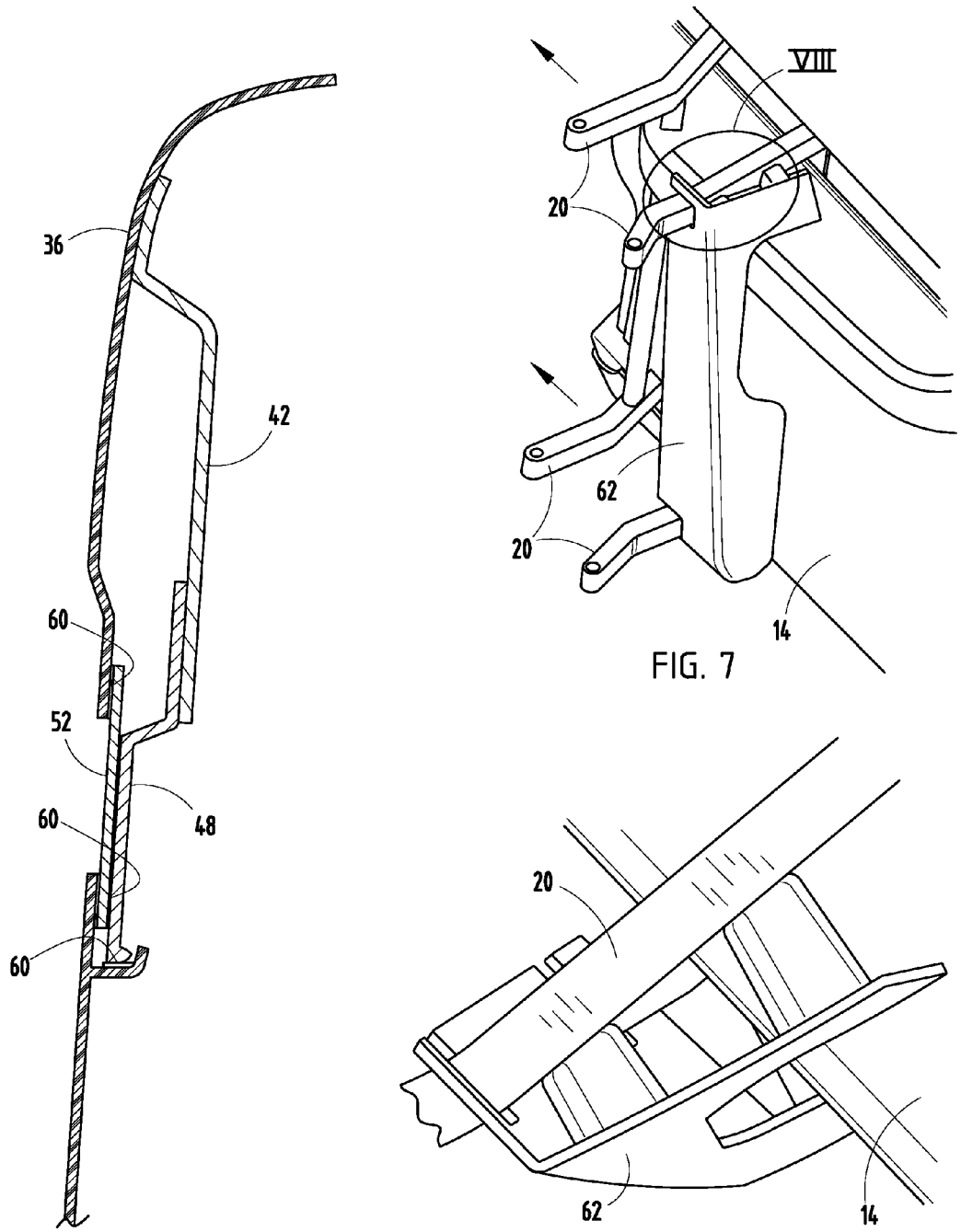

DOOR TRIM MOVING APPLIQUE

FIELD OF THE INVENTION

The present invention concerns vehicle trim panel openings, and more particularly relates to sliding close out panels for such openings.

BACKGROUND OF THE INVENTION

Vehicle sliding doors require sliding mechanisms mounted to the door that facilitate opening and closing of the door relative to the vehicle body. The sliding mechanism will often include tracks and at least one linkage arm that connects the vehicle door to the vehicle body. To properly function, there typically are one or more open areas referred to as trim openings in the door trim panel which allow the linkage arm to freely slide through the trim opening when opening or closing the door. These open areas, often in the form of permanent slots in the trim panel, are unsightly and may be considered unacceptable for craftsmanship and functionality. Accordingly, an apparatus is desired having the advantages of covering sliding mechanism components and the trim panel opening, as well as solving and/or making improvements on the aforementioned disadvantages.

SUMMARY OF THE INVENTION

An aspect of the present invention is to provide an automobile including a sliding door having an opening along a longitudinal axis of the automobile. Also included is a frame having at least one linkage arm, the at least one linkage arm operably associated with the sliding door. Further included is a sliding door panel that includes a door trim panel, a bracket attached to the door trim panel, the bracket having a plurality of substantially vertical slots, and a sliding appliqué aligned along the longitudinal axis of the automobile and extending to cover the opening, the sliding appliqué having a plurality of studs disposed within the plurality of substantially vertical slots. The sliding appliqué also includes a trim panel tab located at a first end of the sliding appliqué, wherein the trim panel tab has a curved geometry that engages the at least one linkage arm to actuate vertical displacement of the sliding appliqué.

Another aspect of the present invention is to provide a sliding door panel for covering an opening in an automobile sliding door including a door trim panel. The sliding door panel includes a bracket mounted to the door trim panel having at least one slot. Further included is a sliding appliqué having at least one stud positioned within the at least one substantially vertical slot, wherein the slot is configured to guide the vertical displacement of the sliding appliqué, and wherein a first end of the sliding appliqué includes a trim panel tab.

Yet another aspect of the present invention is to provide a sliding door panel for covering an opening in a trim panel of a sliding door including a bracket having a first guiding member. The sliding door panel includes a sliding appliqué having a second guiding member capable of associating with the first guiding member, and wherein the sliding appliqué includes a first end having a protruding configuration extending away from the trim panel.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6 is a cross-sectional view of the sliding door panel;

FIG. 7 is a perspective view of a four bar linkage, illustrating a cover trim panel attached thereto; and FIG. 8 is an enlarged view of the cover trim panel attachment to the four bar linkage.

DETAILED DESCRIPTION OF THE PREFERRED EMBODIMENTS

Figure 1:
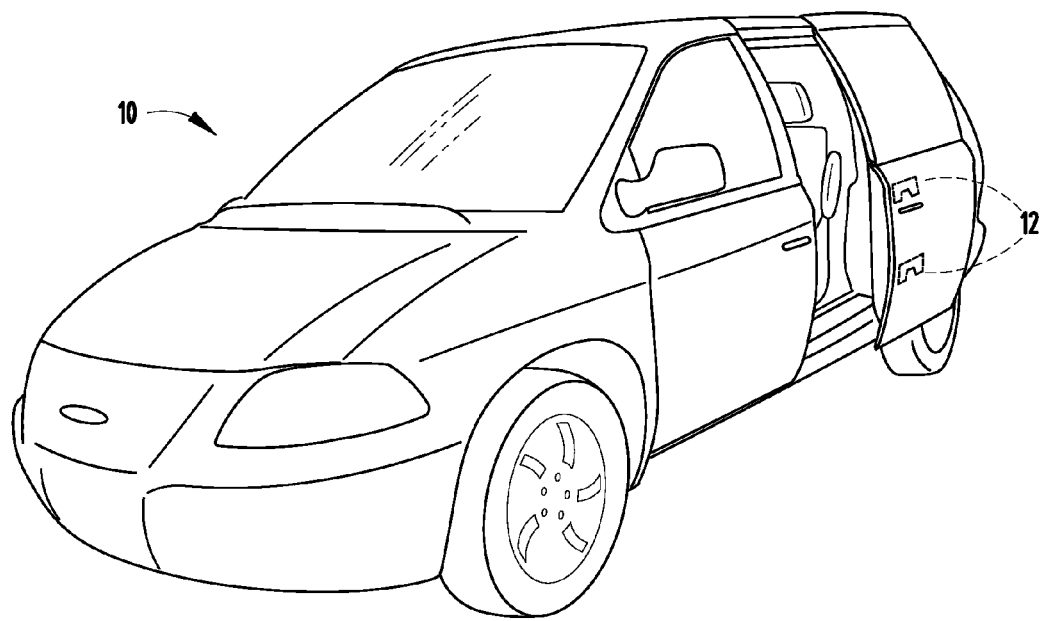
FIG. 1 is an upper left perspective view of an automobile having a sliding door panel for an opening in a sliding vehicle door.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
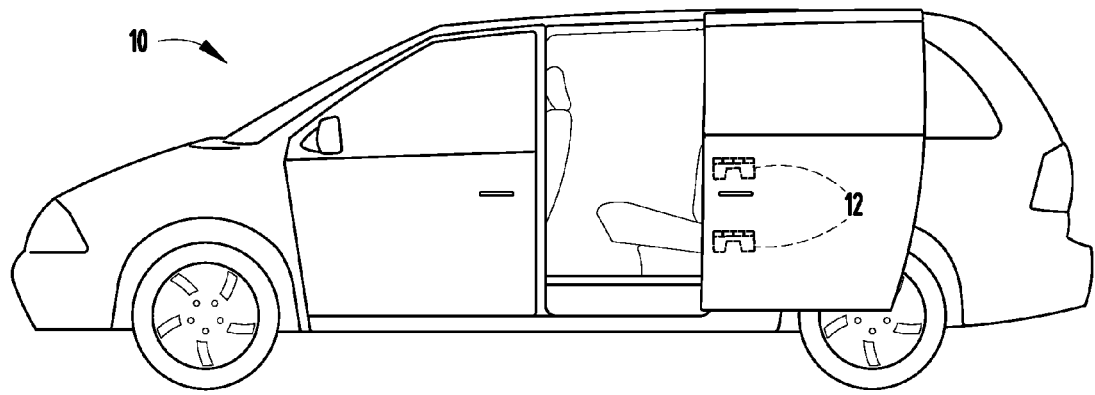
FIG. 2 is a side view of the automobile having a sliding door panel for an opening in the sliding vehicle door.

Referring to FIGS. 1 and 2, the reference number 10 generally designates an automobile (automotive vehicle) having a sliding door panel 12 for covering an opening in a trim panel of a sliding door including a bracket having a first guiding member. Also included in the sliding door panel 12 is a sliding appliqué having a second guiding member capable of associating with the first guiding member, and wherein the sliding appliqué includes a first end having a protruding configuration extending away from the trim panel.

Figure 3:
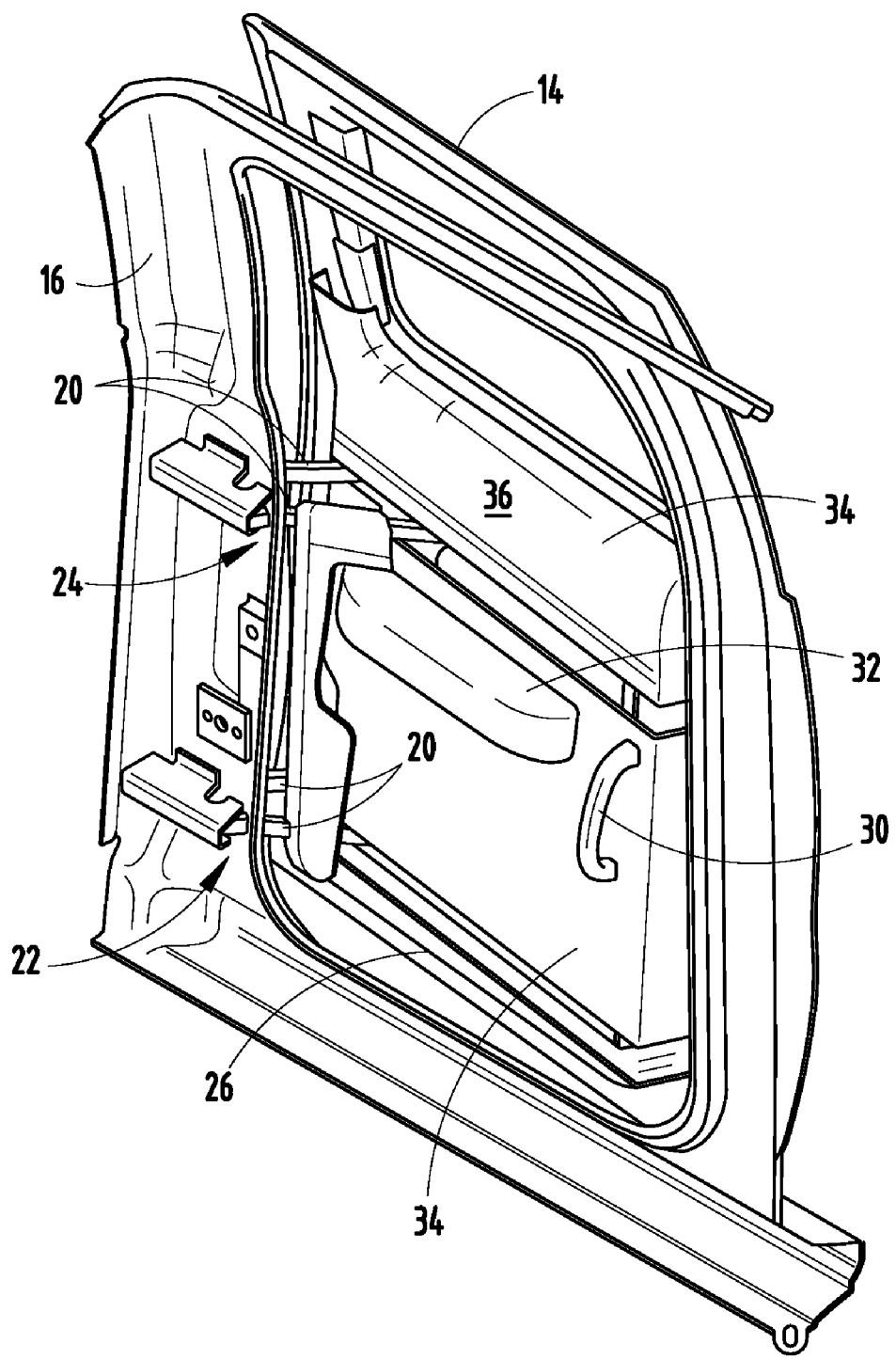
FIG. 3 is a perspective view of the sliding vehicle door in a slightly opened position.
Figure 4:
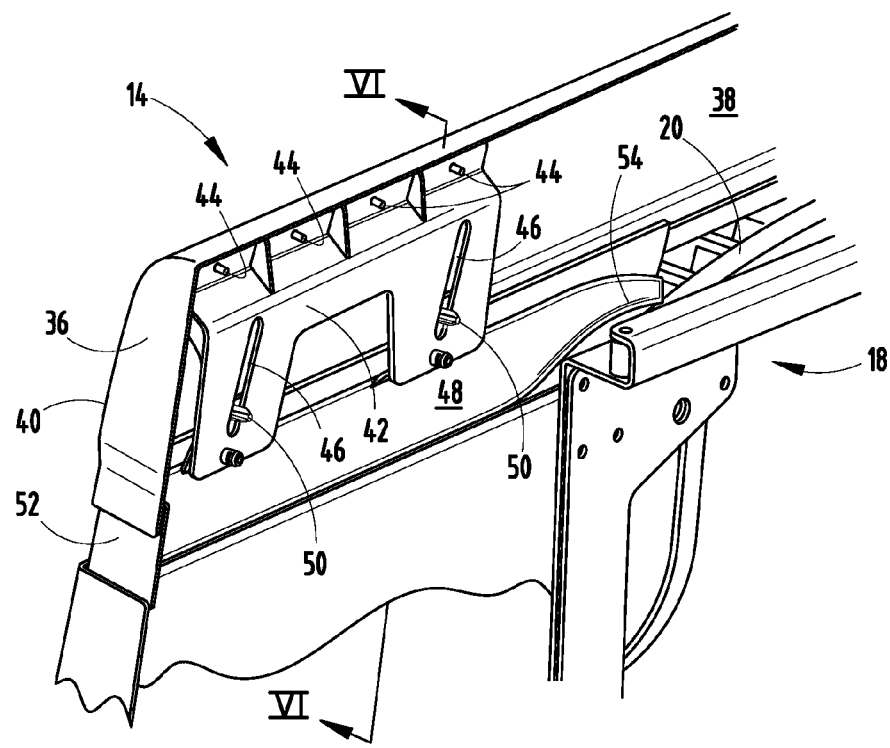
FIG. 4 is a perspective view of the sliding door panel, illustrating the door in a closed, forward position.
Figure 4A:
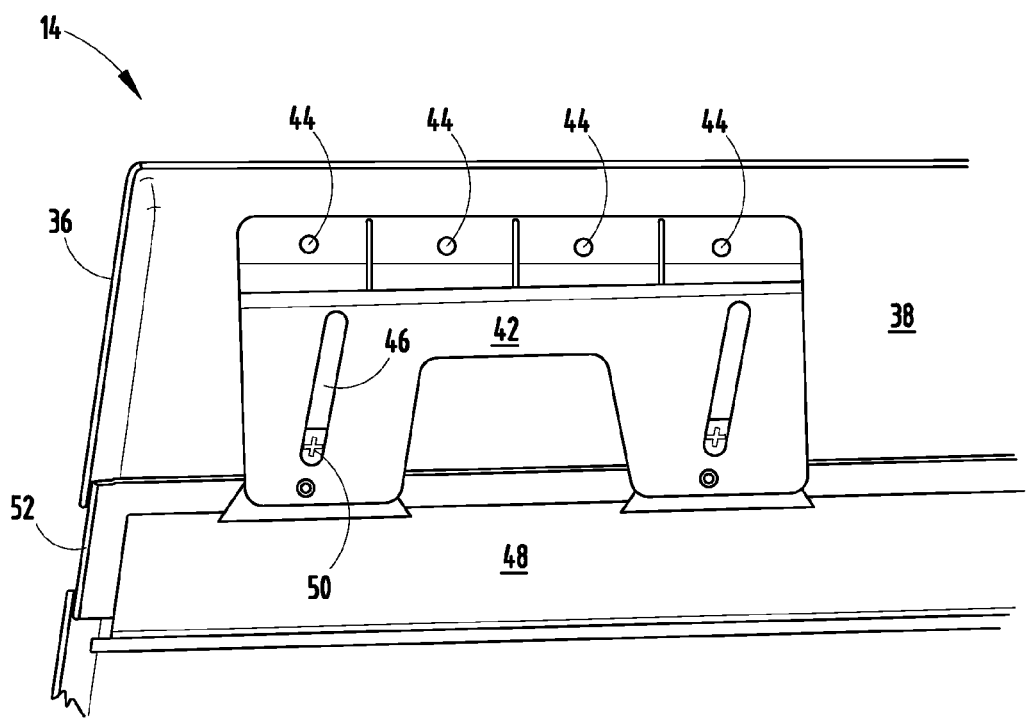
FIG. 4A is a side view of the sliding door panel, illustrating the door in a closed, forward position.
Figure 5:
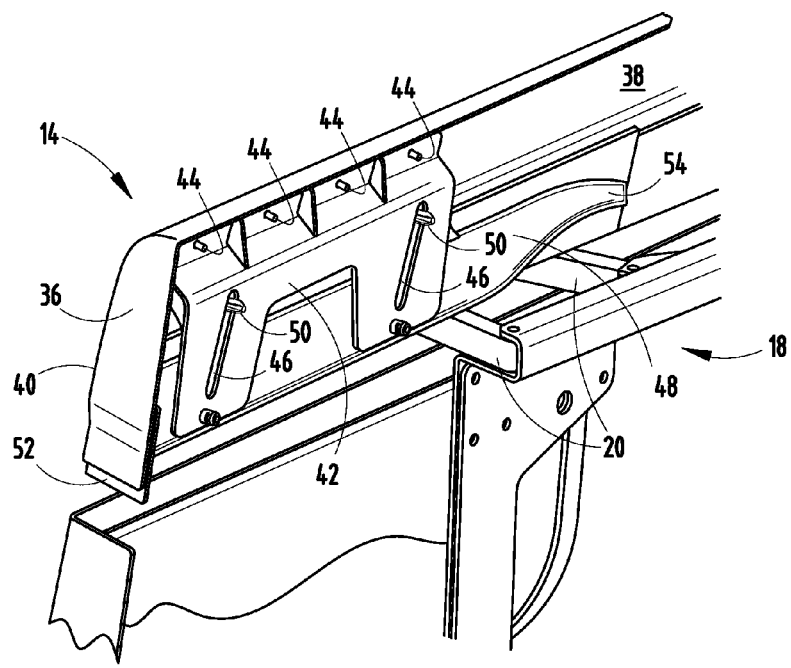
FIG. 5 is a perspective view of the sliding door panel, illustrating the door in an opened, rearward position.
Figure 5A:
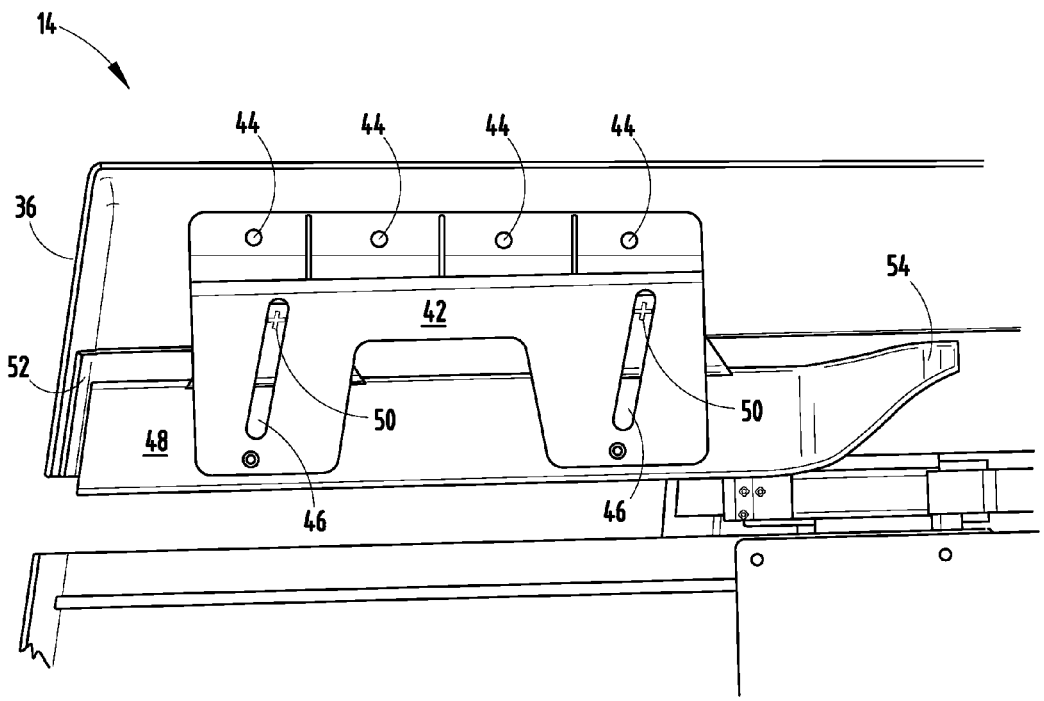
FIG. 5A is a side view of the sliding door panel, illustrating the door in an opened, rearward position.

As shown in FIG. 3, the automobile sliding door 14 is connected to the automobile frame 16 via a linkage structure 18 that includes at least one linkage arm 20. The automobile door 14 is illustrated in a slightly open position, with the connecting linkage arms 20 exposed. In the illustrated example, a four-bar linkage structure 18 is employed, with a lower pair of linkage arms 22 located at a region proximate a bottom edge 26 of the sliding door 14, and with an upper pair of linkage arms 24 located at distance above the lower pair 22. Conceivably, any number of linkage arms 20 at various locations relative to the door 14 may be employed to facilitate connection to the automobile frame 16.

The surface of the sliding door 14 that faces the interior of the automobile 10 is decorated with functional components, such as a grab handle 30 to assist in opening and closing of the door 14 and an armrest 32, as well as aesthetically pleasing components such as door panel(s) 34 that provide passengers with a more pleasant riding experience. The door panel(s) 34 also function to cover holes, slots, and openings that are present in the door 14 structure. Covering of these openings also prevent objects or debris from entering the door 14, thereby preventing undesired noise or vibration that would result from loose debris rattling within the door 14.

Referring to FIGS. 4-6A, the sliding door panel 12 is illustrated in various stages of operation. The sliding door panel 12 has three main components in the described embodiment. First, the door trim panel 36 is a member of the overall plurality of door panels 34 that provide the aesthetically pleasing vehicle interior described above. The door trim panel 36 has an interior surface 38 (A-side) and an exterior surface 40 (B-side), with the interior surface 38 facing the vehicle door frame 16, and the exterior surface 40 facing the interior of the vehicle passenger compartment, thereby being visible to vehicle passengers. A bracket 42 is attached to the interior surface 38 of the door trim panel 36, with the attachment 44 being made in any suitable manner. The attachment 44 is made at an upper region of the bracket 42. For example, the bracket 42 may be heat staked, bolted, or screwed to the door trim panel 36. The bracket 42 includes at least one, but typically a plurality of, slots 46 arranged in a substantially vertical manner. In the embodiment shown, the bracket 42 has two spaced slots 46 each extending substantially vertical at an angle of about 10° from the vertical axis.

A sliding appliqué 48 is connected to a lower region of the bracket 42 via a spring or other tension generating mechanism. The appliqué 48 includes at least one post 50 residing within the at least one slot 46. The number of posts 50 may correspond to the number of slots 46 included in the bracket 42, however, it is conceivable that more slots or posts may be present. While two slots 46 are shown provided in bracket 42 and two posts 50 are provided in the appliqué 48, it should be appreciated that other connections may be employed. For example, the slots 46 could be provided in the appliqué 48 and the posts 50 provided in the bracket 42. Thus, two posts 50 are illustrated in the embodiment shown.

The appliqué 48 also includes an exterior face 52 that is configured to fill the gap in the door panels 34 that is required for opening and closing of the door 14, as described above. The exterior face 52 functions to close out the gap and may be decoratively designed to match the door trim panel 36. The rearward portion of the sliding appliqué 48 has a trim panel tab 54 having a curved or inwardly protruding geometry. The curvature extends inward toward the door frame 16 and away from the passenger compartment and is configured to tailor the height of the sliding appliqué 48. The curvature of the trim panel tab 54 enables connection of the sliding appliqué 48 with the upper linkage arm 20 upon rearward, or opening, movement of the door 14. The connection involves the bottom edge of the trim panel tab 54 sliding on top of the upper linkage arm 20. As the connection of the appliqué 48 with the linkage arm 20 is initiated, the curvature allows an inward and upwardly motion of the sliding appliqué 48, thereby exposing the door paneling gap necessary for passage of the linkage arms 20 during door 14 opening and closing. The appliqué 48 is guided upwardly in a controlled manner by the posts 50 sliding within the slots 46 of the bracket 42 to transition horizontal movement of the door to vertical motion of the appliqué 48. The appliqué 48 slides completely above, and clear of, the upper linkage arm 20 during the opening motion of the door 14. This configuration allows the door 14 to open fully, as it is not impeded in any way by the sliding door 14. It should be noted that all connection interfaces that entail sliding movement between parts are coated with a low friction material 60, such as flock tape, as illustrated in the embodiment shown in FIG. 6.

Closure of the door 14 occurs when the door 14 is slid in a reverse direction as that of opening, with the appliqué 48 sliding along the top edge of the upper linkage arm 20. Upon reaching the trim panel tab 54 curvature, the sliding appliqué 48 begins a downward motion along the curved geometry, as a result of gravity, as well as the downward force generated by the tension of the spring connection between the bracket 42 and appliqué 48. Completion of the closing of the door 14 results in full blocking of the door panel gap, as the exterior face of the appliqué 48 reaches the full downward position.

Referring to FIGS. 7 and 8, a cover trim panel 62 may be attached to the linkage arms 20. The cover trim panel 62 is connected to an upper and lower linkage arm, thereby providing a cover for the linkage arms 20 when the vehicle door 14 is in a closed position. Attachment may be made by snap-fit pieces or by any other suitable mechanical fastener.

Accordingly, the sliding door panel 12 advantageously closes out or covers one or more vehicle door openings that are necessarily present in sliding vehicle door systems, thereby providing an aesthetically-pleasing look for vehicle passengers when the vehicle door is in the closed position.

It is to be understood that variations and modifications can be made on the aforementioned structure without departing from the concepts of the present invention, and further it is to be understood that such concepts are intended to be covered by the following claims, unless these claims by their language expressly state otherwise.

The invention claimed is:

1. An automobile comprising:
   a sliding door having an opening along a longitudinal axis of the automobile;
   a frame having at least one linkage arm, the at least one linkage arm operably associated with the sliding door; and
   a sliding door panel comprising:
      a door trim panel;
      a bracket attached to the door trim panel, the bracket having a plurality of substantially vertical slots; and
      a sliding appliqué aligned along the longitudinal axis of the automobile and extending to cover the opening, the sliding appliqué having a plurality of studs disposed within the plurality of substantially vertical slots, a trim panel tab located at a first end of the sliding appliqué, wherein the trim panel tab has a curved geometry that engages the at least one linkage arm to actuate vertical displacement of the sliding appliqué.

2. The automobile of claim 1, wherein the sliding door panel includes a spring operatively associated with the sliding appliqué and the bracket, and wherein the spring is capable of generating tension between the sliding appliqué and the bracket.

3. The automobile of claim 2, wherein the frame has four linkage arms, wherein a lower pair of linkage arms is located proximate a bottom edge of the sliding door, and wherein an upper pair of linkage arms is located at a position above the lower pair of linkage arms.

4. The automobile of claim 3, wherein the sliding door panel is associated with the upper pair of linkage arms, and wherein the automobile further comprises a second sliding door panel that is associated with the lower pair of linkage arms.

5. The automobile of claim 2, wherein the sliding door opening includes at least one track for the at least one linkage arm to slidably translate through.

6. The automobile of claim 2, wherein the bracket is heat staked to the door panel.

7. The automobile of claim 2, wherein the sliding door panel surfaces include flock tape.

8. The automobile of claim 4, wherein the automobile includes a cover trim panel attached to the upper pair of linkage arms and the lower pair of linkage arms.

9. A sliding door panel for covering an opening in an automobile sliding door comprising:
- a door trim panel;
- a bracket mounted to the door trim panel having at least one slot; and
- a sliding appliqué having at least one stud positioned within the at least one slot, wherein the slot is configured to guide vertical displacement of the sliding appliqué, and wherein a first end of the sliding appliqué includes a trim panel tab.

10. The sliding door panel for covering said opening in said automobile sliding door of claim 9, wherein the sliding door panel includes a spring operatively associated with the sliding appliqué and the bracket, and wherein the spring is capable of generating tension between the sliding appliqué and the bracket.

11. The sliding door panel for covering said opening in said automobile sliding door of claim 10, wherein the automobile sliding door is connected to an automobile frame, the frame having four linkage arms, wherein a lower pair of linkage arms is located proximate a bottom edge of the sliding door, and wherein an upper pair of linkage arms is located at a position above the lower pair of linkage arms.

12. The sliding door panel for covering said opening in said automobile sliding door of claim 11, wherein the sliding door panel is associated with the upper pair of linkage arms, and wherein a second sliding door panel is associated with the lower pair of linkage arms.

13. The sliding door panel for covering said opening in said automobile sliding door of claim 10, wherein the sliding door opening includes tracks for at least one linkage arm to slidably translate through.

14. The sliding door panel for covering said opening in said automobile sliding door of claim 10, wherein the bracket is heat staked to the door panel.

15. The sliding door panel for covering said opening in said automobile sliding door of claim 10, wherein the sliding door panel surfaces include flock tape.

16. The sliding door panel for covering said opening in said automobile sliding door of claim 12, wherein a cover trim panel is attached to the upper pair of linkage arms and the lower pair of linkage arms.

17. A sliding door panel for covering an opening in a trim panel of a sliding door comprising:
- a bracket including a first guiding member; and
- a sliding appliqué including a second guiding member associated with the first guiding member to guide vertical displacement of the sliding appliqué, wherein the sliding appliqué includes a first end having a protruding configuration extending away from the trim panel.

18. The sliding door panel for covering said opening in said trim panel of a sliding door of claim 17, wherein the sliding door panel includes a spring operatively associated with the sliding appliqué and the bracket, and wherein the spring is capable of generating tension between the sliding appliqué and the bracket.

19. The sliding door panel for covering said opening in said trim panel of a sliding door of claim 17, wherein the trim panel opening includes tracks for at least one linkage arm to slidably translate through.

20. The sliding door panel for covering said opening in said trim panel of a sliding door of claim 17, wherein the bracket is heat staked to the door panel, and wherein the sliding door panel surfaces include flock tape.

21. The sliding door panel for covering said opening in said automobile sliding door of claim 9, wherein the at least one slot is a substantially vertical slot.

22. The sliding door panel for covering said opening in said automobile sliding door of claim 21, wherein the substantially vertical slot extends substantially vertical at an angle of about ten degrees from a vertical axis.

23. A sliding door panel for covering an opening in an automobile sliding door comprising:
- a door trim panel;
- a bracket mounted to the door trim panel and including a first guiding member; and
- a sliding appliqué including a second guiding member associated with the first guiding member to guide vertical displacement of the sliding appliqué to cover the opening in one vertical position and to expose the opening in another vertical position.

* * * * *